US012357851B2

(12) United States Patent
Locke et al.

(10) Patent No.: US 12,357,851 B2
(45) Date of Patent: Jul. 15, 2025

(54) MODULAR SUPPORT SYSTEM FOR SELF-CONTAINED BREATHING APPARATUS

(71) Applicant: DRAGER SAFETY AG & CO KGaA, Lubeck (DE)

(72) Inventors: Matthew William Locke, Morpeth (GB); Christopher Hussey, Tyne and Wear (GB)

(73) Assignee: Dräger Safety AG & Co. KGaA, Lübeck (DE)

( * ) Notice: Subject to any disclaimer, the term of this patent is extended or adjusted under 35 U.S.C. 154(b) by 240 days.

(21) Appl. No.: 18/095,587

(22) Filed: Jan. 11, 2023

(65) Prior Publication Data

US 2023/0226385 A1 Jul. 20, 2023

(30) Foreign Application Priority Data

Jan. 19, 2022 (GB) ...................................... 2200658

(51) Int. Cl.

*A62B 25/00* (2006.01)
*A62B 9/04* (2006.01)
*F17C 13/08* (2006.01)

(52) U.S. Cl.

CPC ................ *A62B 25/00* (2013.01); *A62B 9/04* (2013.01); *F17C 13/084* (2013.01)

(58) Field of Classification Search

CPC .......... A62B 25/00; A62B 9/04; F17C 13/084
See application file for complete search history.

(56) References Cited

U.S. PATENT DOCUMENTS 3,483,865 A * 12/1969 Arne ........................ A62B 7/02 211/74
4,889,306 A * 12/1989 Boucher ................. B63C 11/22 405/187

(Continued)

FOREIGN PATENT DOCUMENTS

DE 1278844 B 9/1968
DE 202009000781 U1 3/2009

(Continued)

OTHER PUBLICATIONS

MSA Safety Incorporated AirGo SCBA operating manual published in 2018, http://s7d9.scene7.com/is/content/minesafetyappliances/OPM_AirGo_10082058_GB (Year: 2018).*

(Continued)

*Primary Examiner* — Terrell L McKinnon
*Assistant Examiner* — Ding Y Tan
(74) *Attorney, Agent, or Firm* — Banner & Witcoff, Ltd.

(57) ABSTRACT

A modular support system for a self-contained breathing apparatus, comprising: a support for a self-contained breathing apparatus, the support comprising a cylinder mount and a component mount, wherein the cylinder mount is for mounting a single cylinder of compressed gas to the support in a single cylinder configuration of the modular support system; and wherein the component mount is for mounting a functional component for the self-contained breathing apparatus in the single cylinder configuration; the system further comprising an adaptor bracket for mounting an assembly of multiple cylinders to the support in a multiple cylinder pack configuration; wherein the adaptor bracket has mount portions configured to be mounted to the component mount and the cylinder mount. There is also disclosed an adaptor bracket and a method of converting a single-cylinder support.

15 Claims, 5 Drawing Sheets

(56) References Cited

U.S. PATENT DOCUMENTS

| | | | | |
|---|---|---|---|---|
| 5,913,467 | A * | 6/1999 | Berg | A62B 9/04 224/628 |
| 6,367,753 | B1 * | 4/2002 | Berg | A62B 9/04 248/223.41 |
| 6,883,766 | B1 * | 4/2005 | Ziaylek | A62B 9/04 248/316.1 |
| D523,920 | S * | 6/2006 | Cresswell | D21/804 |
| 7,647,927 | B2 * | 1/2010 | Teetzel | A62B 7/10 55/467 |
| 7,748,380 | B1 * | 7/2010 | Phifer | A62B 18/006 55/467 |
| 7,963,597 | B2 * | 6/2011 | Bostrom | A62B 9/04 297/188.04 |
| 8,006,877 | B2 * | 8/2011 | Lowry | A45F 3/04 224/660 |
| 8,113,198 | B2 * | 2/2012 | Teetzel | A62B 18/006 128/205.27 |
| 10,850,138 | B2 * | 12/2020 | Liu | A62B 25/00 |
| 2002/0078959 | A1 | 6/2002 | Haeuser | |
| 2008/0179366 | A1 * | 7/2008 | Hogg | A62B 9/04 224/628 |
| 2009/0045657 | A1 | 2/2009 | Bostrom et al. | |
| 2010/0282261 | A1 * | 11/2010 | Wrigley | A62B 25/00 128/205.22 |
| 2010/0282791 | A1 * | 11/2010 | Townsend | A62B 25/00 224/191 |
| 2012/0067348 | A1 * | 3/2012 | Steck | A62B 7/04 128/205.25 |
| 2015/0144675 | A1 * | 5/2015 | Losos | A45F 3/047 224/637 |
| 2019/0151689 | A1 * | 5/2019 | Peng | A62B 25/00 |
| 2021/0261299 | A1 * | 8/2021 | Hannard | B65D 25/22 |

FOREIGN PATENT DOCUMENTS

| | | | | |
|---|---|---|---|---|
| EP | 1913977 | A1 | 4/2008 | |
| GB | 2489050 | A * | 9/2012 | A62B 9/04 |
| WO | 2012127202 | A2 | 9/2012 | |
| WO | 2012127204 | A2 | 9/2012 | |
| WO | WO-2015080956 | A1 * | 6/2015 | A45F 3/047 |

OTHER PUBLICATIONS

M1 SCBA system products and components presentation titled "Your SCBA Platform for the Future" from MSA Safety Incorporated dated 2018 (Year: 2018).*

Lefeet scuba tank mount sold on amazon dated Oct. 12, 2021, https://www.amazon.com/LEFEET-Scuba-Tank-Mounts/dp/B09J8GFB99 (Year: 2021).*

Search Report, dated Dec. 7, 2022, issued in priority GB Application No. GB2200658.9.

* cited by examiner

MODULAR SUPPORT SYSTEM FOR SELF-CONTAINED BREATHING APPARATUS

CROSS-REFERENCE TO RELATED APPLICATIONS

This application is based on and claims priority to UK Application No. 2200658.9, filed on Jan. 19, 2022, the entire contents of which being fully incorporated herein by reference.

The present disclosure relates to a modular support system for a self-contained breathing apparatus, an adaptor bracket for use with the modular support system, and a method of converting a single-cylinder support for a self-contained breathing apparatus.

BACKGROUND OF THE INVENTION

Typical support systems for self-contained breathing apparatus comprise a universal cylinder support which is configured to support a single cylinder of compressed gas in a single cylinder configuration or two separate cylinders of compressed gas in a twin cylinder configuration (i.e. two cylinders that are not bound together mechanically or pneumatically). To adjust between a single cylinder configuration and a twin cylinder configuration, each cylinder has to be loaded separately, a cylinder strap has to be adjusted from single to twin cylinder configuration and a manifold (or T-piece) is required to connect the cylinders.

In alternative arrangements, a twinpack cylinder support may be provided which is configured to support a twinpack (a dual cylinder cartridge bound together mechanically and pneumatically to share the same valve). The geometry of the single cylinder support and twinpack support are distinct. When it is desired to use a single or twin cylinder configuration, a specific universal cylinder support is chosen by the user. When it is desired to use a twinpack configuration, a specific twinpack cylinder support is chosen by the user.

It may therefore be desirable to provide an improved arrangement which allows a support to be converted as desired by a user, and which may be used with an existing support.

SUMMARY OF THE INVENTION

According to an arrangement, there is provided a modular support system for a self-contained breathing apparatus, comprising: a support for a self-contained breathing apparatus, the support defining a cylinder mount and a component mount, wherein the cylinder mount is for mounting a single cylinder of compressed gas to the support in a single cylinder configuration of the modular support system; and wherein the component mount is for mounting a functional component for the self-contained breathing apparatus in the single cylinder configuration; the system further comprising an adaptor bracket for mounting an assembly of multiple cylinders to the support in a multiple cylinder pack configuration; wherein the adaptor bracket has separate mount portions configured to be mounted to the component mount and the cylinder mount, respectively.

The support may comprise a plurality of cylinder mounts, and the adaptor bracket may have mount portions configured to be mounted to the component mount and to at least one of the cylinder mounts.

The support may be configured to support two cylinders in a twin cylinder configuration, in which two single, separate cylinders are attached to the support. The plurality of cylinder mounts may each be configured to support a single cylinder, such that two cylinders are attached in a twin cylinder configuration. In the twin cylinder configuration, the single cylinders are not bound together mechanically or pneumatically prior to mounting of the separate cylinders to the support. After mounting in the twin cylinder configuration, the two single cylinders may be pneumatically connected with a manifold (or T-piece). The functional component for the self-contained breathing apparatus in the single cylinder configuration may also be a functional component for the self-contained breathing apparatus in a twin cylinder configuration.

The assembly of multiple cylinders may be in a multiple cylinder pack arrangement in which multiple cylinders are mechanically and/or pneumatically connected (or bound) to form a multiple cylinder pack (e.g. a twinpack, a triple-pack, etc) assembly. The adaptor bracket may be for mounting an assembly of multiple cylinders which are mechanically and/or pneumatically connected to form a multiple cylinder pack (e.g a twinpack, a triple-pack, etc) assembly.

One of the mount portions of the adaptor bracket may be configured to be directly mounted to the component mount. A mount portion of the adaptor bracket configured to be directly mounted to the component mount may be a component mount portion. The component mount portion may be configured to mimic the geometry of at least a part of the functional component for the self-contained breathing apparatus. One of the mount portions of the adaptor bracket may be configured to be directly mounted to the cylinder mount of the support. A mount portion of the adaptor bracket may be configured to be directly mounted to the cylinder mount, and may be a cylinder mount portion. The component mount portion may be configured to mimic the geometry of at least a part of a cylinder mount for mounting a single cylinder of compressed gas. The component mount portion may be configured to mimic the geometry of at least a part of a cradle for mounting a single cylinder of compressed gas.

The component mount may be for mounting a functional component of a support, pneumatic system, electronic system or a carrying system. The functional component may be a device. The functional component may be a component which is displaced to make way for the adaptor bracket. The functional component may be a pressure reduction valve. The functional component may be a reducer valve. The functional component may be a carrying system such as a strap or waistbelt attachment. The functional component may be a carrying system such as handles or other carrying features of the support. The functional component may be a light. The functional component may be a pressure measurement module. The functional component may be an edge, eyelet, or hanging feature of the support.

The mount portions may be spaced apart along a longitudinal direction of the adaptor bracket. In use, at least one mount portion may be located at an upper region of the adaptor bracket. In use, at least one mount portion may be located at a lower region of the adaptor bracket. In use, at least one mount portion may be located at an upper end of the adaptor bracket. In use, at least one mount portion may be located at a lower end of the adaptor bracket. This arrangement may provide improved support and stability for the adaptor and any mounted cylinders by distributing the weight of the adaptor and any mounted cylinders.

The adaptor bracket may comprise two mount portions configured to be attached to the cylinder mount of the support. The two mount portions configured to be attached to the cylinder mount of the support may be spaced apart in a lateral direction of the adaptor bracket, in use. The two mount portions configured to be attached to the cylinder mount of the support may comprise a left mount portion and a right mount portion in use.

The adaptor bracket may comprise two mount portions configured to be attached to at least one of the cylinder mounts of the support. The two mount portions configured to be attached to the at least one cylinder mount of the support may be spaced apart in a lateral direction of the adaptor bracket, in use. The two mount portions configured to be attached to the at least one cylinder mount of the support may comprise a left mount portion and a right mount portion in use.

The component mount may be for mounting a pressure reduction valve associated with a single cylinder of compressed gas, such that the component mount is for mounting a single cylinder of compressed gas via the pressure reduction valve. The component mount may be for mounting a pressure reduction valve associated with two single cylinders of compressed gas in a twin cylinder configuration, via a manifold or T-piece, such that the component mount is for mounting two single cylinders of compressed gas via the pressure reduction valve. The pressure reduction valve may be connectable to the support at the component mount. The pressure reduction valve may be removable from the component mount and connectable to the assembly of multiple cylinders of compressed gas.

The cylinder mount may be configured for attachment to a cradle for supporting a single cylinder of compressed gas. The cylinder mount may be configured for attachment to a cradle for supporting a two single cylinders of compressed gas. The cradle may be releasably attachable to the cylinder mount. The cradle may be releasably attachable to the cylinder mount by a pin or pins. The adaptor bracket may be attached to the cylinder mount by the same means as the cradle. The adaptor bracket may be attached to the support at the cylinder mount by a pin or pins. This may allow quick and easy release and mounting of the cradle and the adaptor bracket.

The adaptor bracket may be configured to be pivotably mounted to at least one of the cylinder mount and the component mount. The adaptor bracket and at least one of the cylinder mount and the component mount may form a pivotable connection. The adaptor bracket may be hingedly connected to at least one of the cylinder mount and the component mount.

The adaptor bracket may be configured to be pivotably mounted to the support by the pivotable connection. In this way, the adaptor bracket may be first mounted at a pivotable connection and then pivoted into contact with the other mount portion, enabling ease of installation of the adaptor bracket.

At least one of the mount portions may be substantially cylindrical. The corresponding cylinder mount or component mount may be configured to receive a substantially cylindrical mount portion. The corresponding cylindrical or component mount may be substantially hook-shaped.

At least one of the connections between the mount portions and the cylinder mount or component mount may be a snap-fit. At least one of the mount portions may be substantially cylindrical and may be snap-fit into a complementary cylinder mount or component mount.

At least one of the connections between the mount portions and the cylinder mount or component mount may be configured to be secured by a pin. At least one of the connections between the mount portions and the cylinder mount or component mount may be configured to be secured by a plurality of pins. The pins may provide quick attachment and quick release of the connection between the mount portions and the cylinder mount or component mount.

The adaptor bracket may be substantially T shaped. The adaptor bracket may comprise a main body and two arms extending laterally from the main body. The main body may define a longitudinal axis. In use, the arms may extend from an upper portion of the main body.

The modular support system may further comprise a pack of two or more cylinders mounted to the adaptor bracket. In an arrangement with two cylinders, the cylinders may be attached together as a twin pack assembly. The two cylinders may be held together by means of bands and tensioning members to form a mechanical unit. The twin pack assembly may comprise a connection manifold or pipe which provides fluid connection between the two cylinders. The connection pipe may also serve as a handle for carrying the twin pack assembly. The twin pack assembly may comprise a valve for connection to a regulator valve. The twin pack assembly may be mounted to the adaptor bracket via the tensioning members.

According to an additional arrangement, there is provided an adaptor bracket for use with the modular support system as defined in any preceding paragraph. The adaptor bracket may be configured to convert a single cylinder support to support a multi-cylinder configuration. The adaptor bracket may be used with an existing single cylinder support.

According to a further arrangement, there is provided a method of converting a single cylinder support for a self-contained breathing apparatus, the support defining a cylinder mount and a component mount, wherein the cylinder mount is for mounting a single cylinder of compressed gas to the support in a single cylinder configuration of the modular support system; and wherein the component mount is for mounting a functional component for the self-contained breathing apparatus in the single cylinder configuration; the method comprising: mounting an adaptor bracket to the support, the adaptor bracket comprising mount portions, the mount portions configured to be mounted to at least one of the component mount and the cylinder mount, the adaptor bracket for mounting an assembly of multiple cylinders to the support in a multiple cylinder pack configuration.

According to a further arrangement, there is provided a method of converting a single cylinder support for a self-contained breathing apparatus, the support defining at least one cylinder mount and a component mount, wherein the or each cylinder mount is for mounting a single cylinder of compressed gas to the support in a single cylinder configuration of the modular support system; and wherein the component mount is for mounting a functional component for the self-contained breathing apparatus in the single cylinder configuration; the method comprising: mounting an adaptor bracket to the support, the adaptor bracket comprising mount portions, the mount portions configured to be mounted to the component mount and at least one of the cylinder mounts of the support, the adaptor bracket for mounting an assembly of multiple cylinders to the support in a multiple cylinder pack configuration.

The method may further comprise removing a functional component from the support before mounting the adaptor bracket. The method may further comprise removing a cradle from the cylinder mount before mounting the adaptor bracket.

According to an additional arrangement, there is provided a modular support system for a self-contained breathing apparatus, comprising: a support for a self-contained breathing apparatus, the support defining at least one cylinder mount and a component mount, wherein the or each cylinder mount is for mounting a single cylinder of compressed gas to the support in a single cylinder configuration of the modular support system; and wherein the component mount is for mounting a functional component for the self-contained breathing apparatus in the single cylinder configuration; the system further comprising an adaptor bracket for mounting an assembly of multiple cylinders to the support in a multiple cylinder pack configuration; wherein the adaptor bracket has mount portions configured to be mounted to the component mount and at least one of the cylinder mounts of the support.

According to an additional arrangement, there is provided a modular support system for a self-contained breathing apparatus, comprising: a support for a self-contained breathing apparatus, the support defining a cylinder mount and a component mount, wherein the cylinder mount is for mounting a single cylinder of compressed gas to the support in a single cylinder configuration of the modular support system; and wherein the component mount is for mounting a functional component for the self-contained breathing apparatus in the single cylinder configuration; the system further comprising an adaptor bracket for mounting an assembly of multiple cylinders to the support in a multiple cylinder pack configuration; wherein the adaptor bracket has mount portions configured to be mounted to at least one of the component mount and the cylinder mount.

The skilled person will appreciate that except where mutually exclusive, a feature described in relation to any one of the above arrangements may be applied to any other arrangement. Furthermore, except where mutually exclusive, any feature described herein may be applied to any arrangement and/or combined with any other feature or parameter described herein.

BRIEF DESCRIPTION OF THE DRAWINGS

For a better understanding of the present invention and to show how it may be carried into effect, reference will now be made, by way of example, to the accompanying drawings, in which.

DETAILED DESCRIPTION OF THE INVENTION

Figure 1:
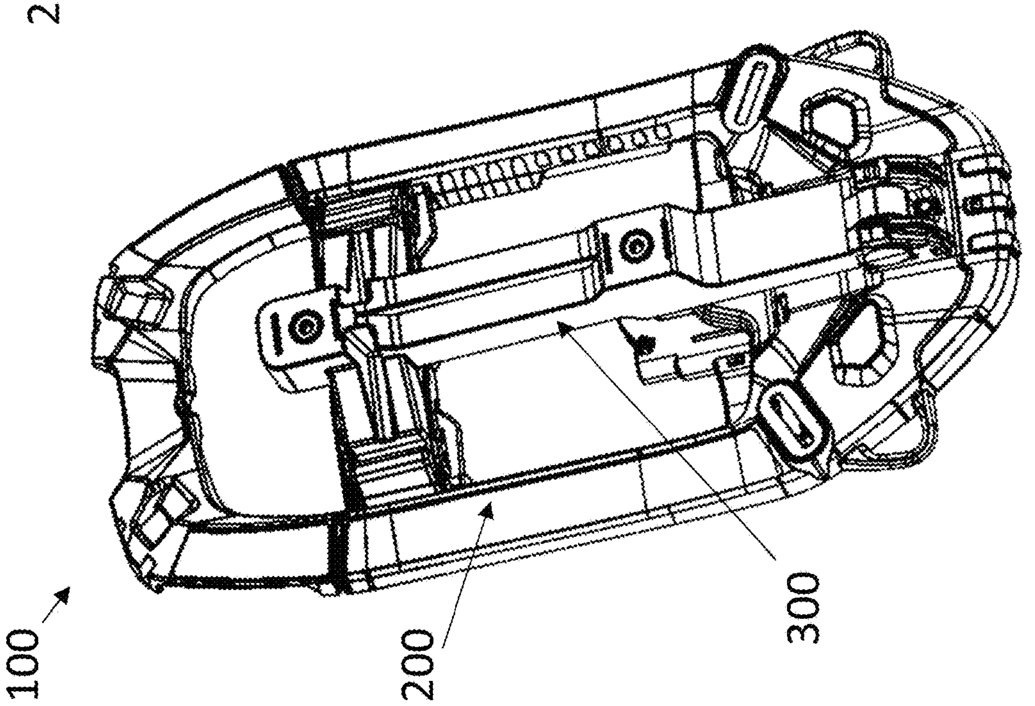
FIG. 1 shows a front view of an example of a modular support system comprising a support and an adaptor bracket.

Referring first to FIG. 1, a modular support system 100 is shown by way of example. The modular support system 100 is for a self-contained breathing apparatus and comprises a support 200 and an adaptor bracket 300.

Figure 2:
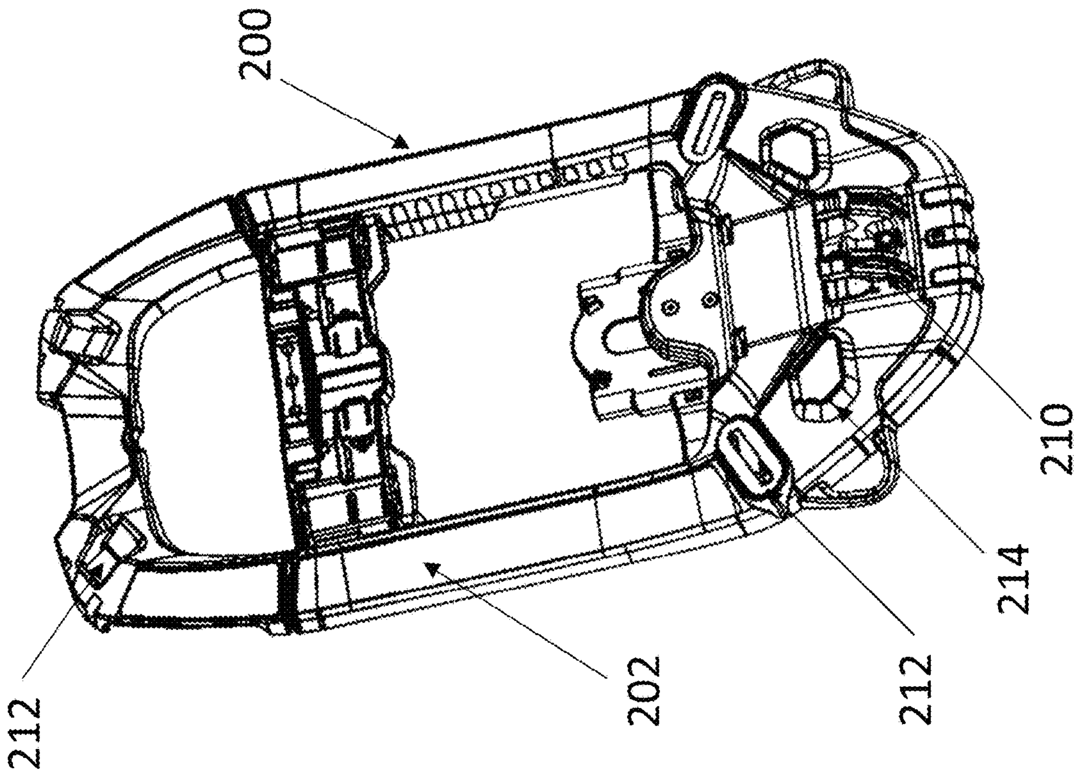
FIG. 2 shows the support of FIG. 1.
Figure 3:
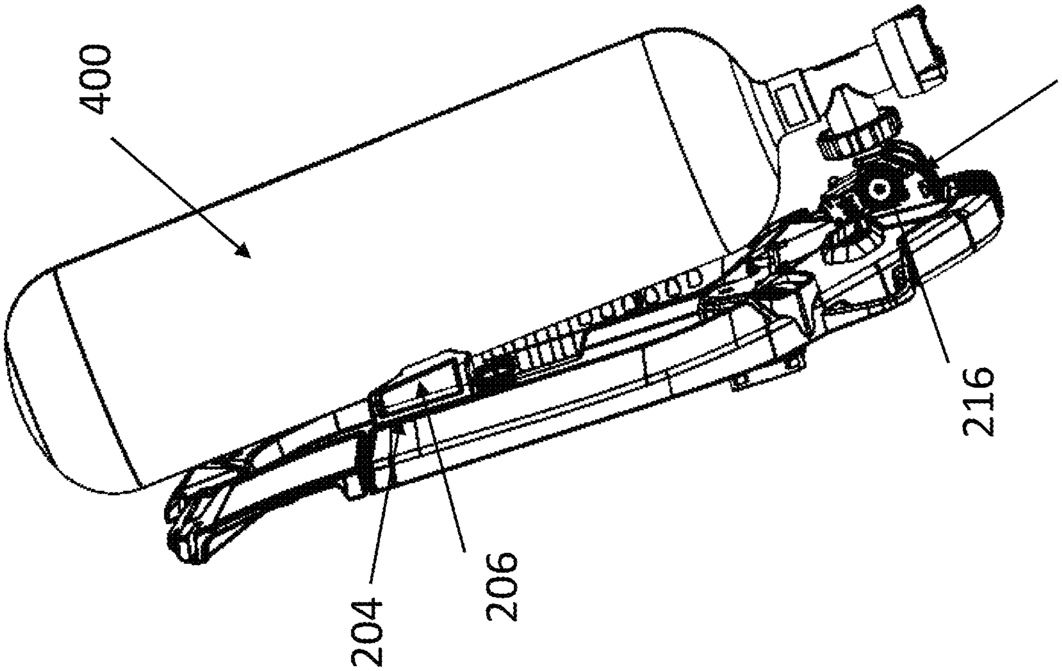
FIG. 3 shows the support of FIG. 1 with a single cylinder of compressed gas mounted to the support.

The support 200 is shown in more detail in FIGS. 2 and 3. The support 200 has a front side (shown in FIG. 2), and an opposing rear side. The support 200 is configured for mounting of a single cylinder 400 of compressed gas to the front side of the support, as shown in FIG. 3. In use, the rear side of the support is arranged to overlie a user's back. It will be understood by the skilled person, that in other embodiments, the support 200 may be configured for mounting two individual single cylinders 400 in a twin cylinder configuration.

The support 200 comprises an elongate frame 202, and a cylinder mount 204 which extends across a width of the front side of the frame 202, in an upper region of the frame 202. In use, in the single cylinder configuration, a cylinder cradle 206 is attached to the cylinder mount 204, via pins (not shown). The cylinder cradle 206 is arranged to support an upper portion of the cylinder 400, as shown in FIG. 3.

Although a single cylinder mount 204 is shown in the illustrated arrangement, in other arrangements (not illustrated) more than one cylinder mount 204 may be used to secure the cylinder 400 to the frame 202.

Figure 4:
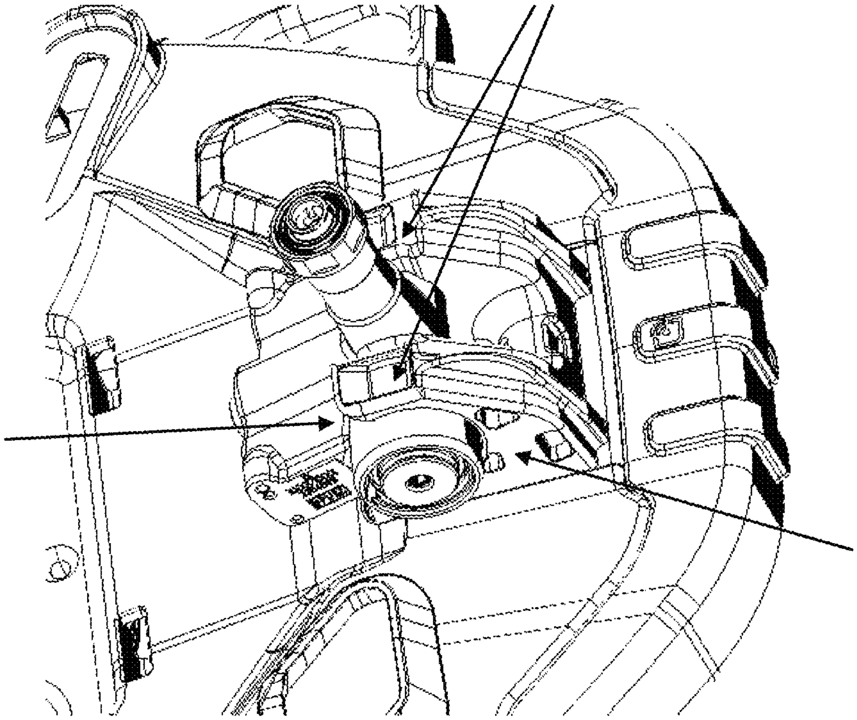
FIG. 4 shows a close-up of the pressure reduction valve mount of the support of FIGS. 1-3.

The support 200 also comprises a plurality of component mounts 210, 212, 214 on the front side, for mounting of various components of the self-contained breathing apparatus. One of the component mounts is a pressure reduction valve mount 210, which is provided at a lower portion of the support 200, and to which a pressure reduction valve 216 of a pneumatic system, is mounted in the single cylinder configuration. As shown in more detail in FIG. 4, the pressure reduction valve mount 210 comprises two retaining arms 218. In FIG. 4, part of the pressure reduction valve 216 is omitted to show the pressure reduction valve mount 210 in more detail. The retaining arms 218 extend from the front face of the support 200, are substantially parallel and each comprises a hook-shaped portion. The retaining arms 218 are configured to engage a substantially cylindrical portion of the pressure reduction valve 216, via a snap fit, and to hold the pressure reduction valve 216 in place during use of the support 200 in a single cylinder configuration.

Referring back to FIG. 2, the support 200 comprises additional component mounts in the form of strap attachment points 212. In use, shoulder and waist straps forming a carrying system (not shown), are attached to the support 200 at the strap attachment points 212, for attachment of the support 200 to the user.

The support 200 further comprises electronic system component mounts in the form of light or pressure measurement module mounts 214. In use, lights (not shown) are attached to the support at the mounts 214. The lights may be used to provide visibility of the user in low light environments. Alternatively, the mounts 214 may be used to mount a pressure measurement module (not shown). The pressure reduction valve, straps, pressure measurement module and lights may all be considered as example functional components of the self-contained breathing apparatus.

Figure 5B:
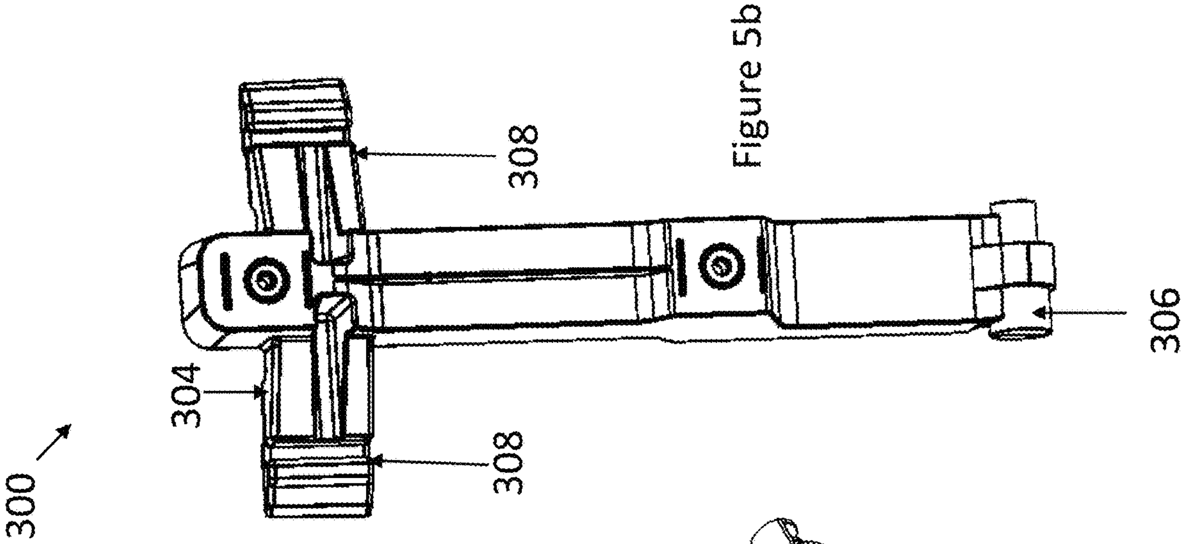
FIGS. 5*a* and 5*b* show side and front views of the adaptor bracket of FIG. 1.
Figure 5A:
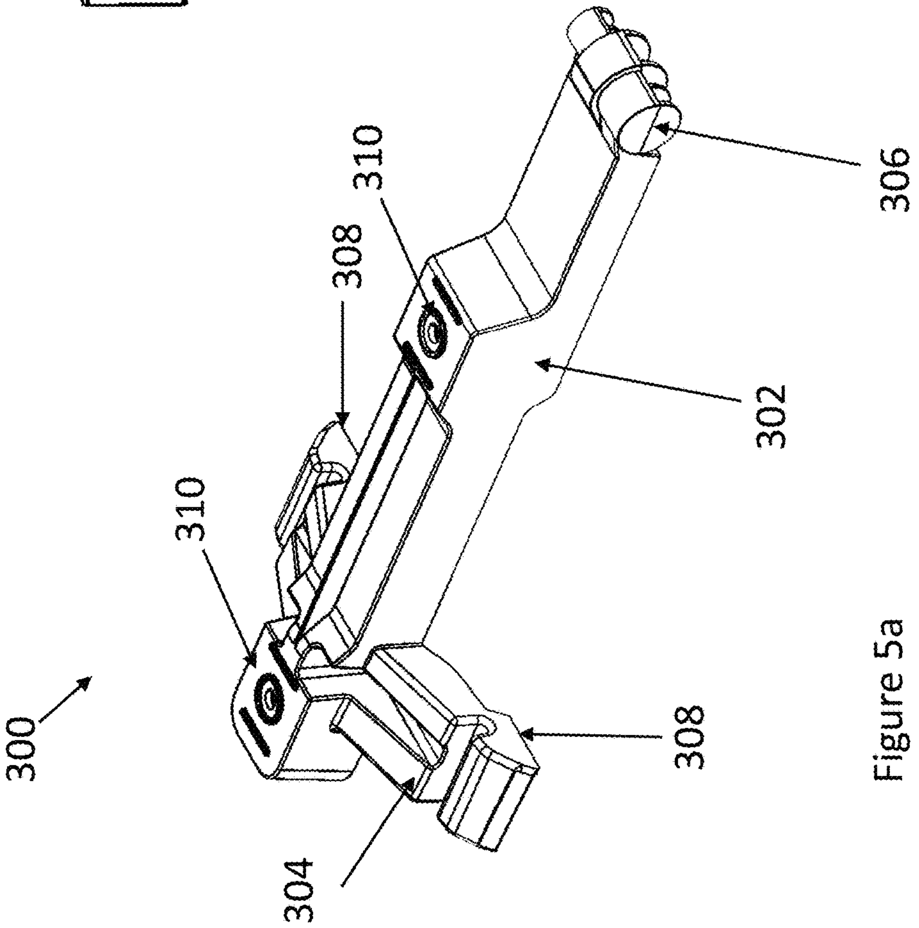

Referring now to FIGS. 5*a* and 5*b*, the adaptor bracket 300 of FIG. 1 is shown in further detail. The adaptor bracket 300 is configured to be mounted onto the front side of the support 200 to enable the mounting of an assembly of multiple cylinders to the support 200 in a multiple cylinder pack configuration as will be described in relation to FIGS. 6-8. The adaptor bracket 300 comprises mount portions 306, 308 via which the adaptor bracket 300 can be mounted to the pressure reduction valve mount 210 and the cylinder mount 204 of the support 200.

The adaptor bracket 300 is substantially T-shaped or cross-shaped and comprises a longitudinal body 302 with two arms 304 which laterally extend either side of the body 302, in a region forming an upper region of the adaptor bracket 300 when in use on a user's back.

A lower mount portion 306 is located at the end of the longitudinal body 302, at the end opposite the arms 304, forming a lower end of the adaptor bracket 300 when in use on a user's back. The lower mount portion 306 is configured for attachment to the pressure reduction valve mount 210. As can be seen, in FIGS. 5*a* and 5*b*, the lower mount portion 306 substantially mimics the geometry of the pressure reduction valve 216, such that the lower mount portion 306 can be mounted to the pressure reduction valve mount 210 in substantially the same way as the pressure reduction valve 216 would be mounted. The lower mount portion 306 comprises a substantially cylindrical profile which may be inserted into and retained within the arms 218 of the pressure reduction valve mount 210. The lower mount portion 306 is retained by a snap-fit with the pressure reduction valve mount 210, although other conventional releasable fixing arrangements are within the scope of the invention. The cooperation between the substantially cylindrical profile of the lower mount portion 306 and the pressure reduction valve mount 210 enables the adaptor bracket 300 to pivot relative to the support 200.

The adaptor bracket 300 further comprises upper mount portions 308 located on each of the arms 304. The upper mount portions 308 are configured for attachment to the cylinder mount 204 of the support 200, by pins (not shown), which may be inserted through the cylinder mount 204 and the upper mount portions 308 to hold the adaptor bracket 300 in place. It will be understood that, in other arrangements, other means of attachment may be considered by the skilled person, such as a pivotable and/or snap-fit attachment as discussed above in relation to the lower mount portion 306 and the pressure reduction valve mount 210.

As the mount portions 306, 308 are spaced apart along a longitudinal direction of the adaptor bracket 300, the weight of the adaptor bracket 300 (and any attached twin/multiple pack assembly) is distributed along the longitudinal direction of the support 200.

Although in this example, the lower mount portion 306 of the adaptor bracket 300 is configured for attachment to the support 200 at the pressure reduction valve mount 210, it will be understood by the skilled person that in other arrangements, the adaptor bracket 300 may have a different shape and may comprise a mount portion 306 configured for attachment at any other functional component mount, such as a mount for another functional component of the pneumatic system, or a component of the support, electronic system (such as a pressure measurement module) or a carrying system (such as handles or carrying features of the support), or an edge, eyelet or hanging feature of the support.

Figure 6:
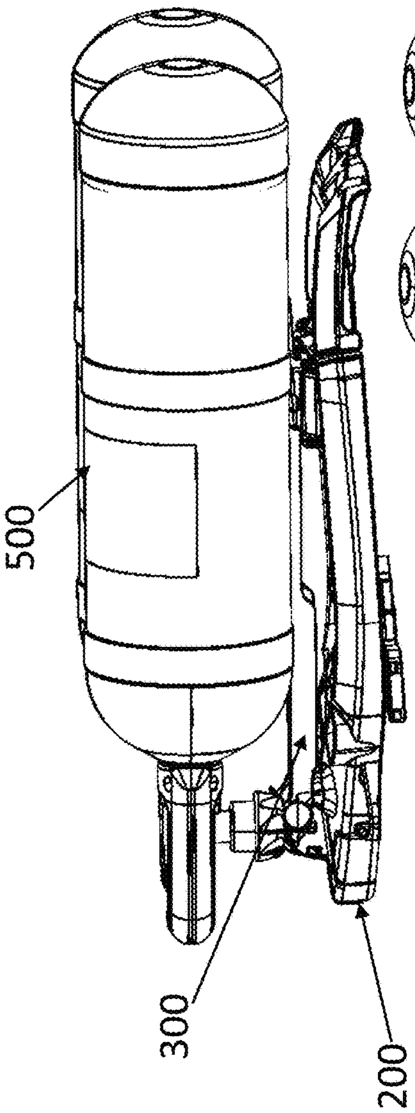
FIG. 6 shows a side view of the modular support system of FIG. 1 with a twin pack cylinder attached.

The front side of the adaptor bracket 300 further comprises attachment points 310 for attachment of a twin/multiple pack assembly 500, via mechanical fastening means, such as bolts. In this way, the adaptor bracket 300 is configured to adapt the support 200 such that the support 200 is able to support a twin/multiple pack assembly 500 of breathing gas. FIG. 6 shows the adaptor bracket 300 attached to the support 200, and further comprising a twin pack assembly 500 attached to the adaptor bracket 300.

Figure 8:
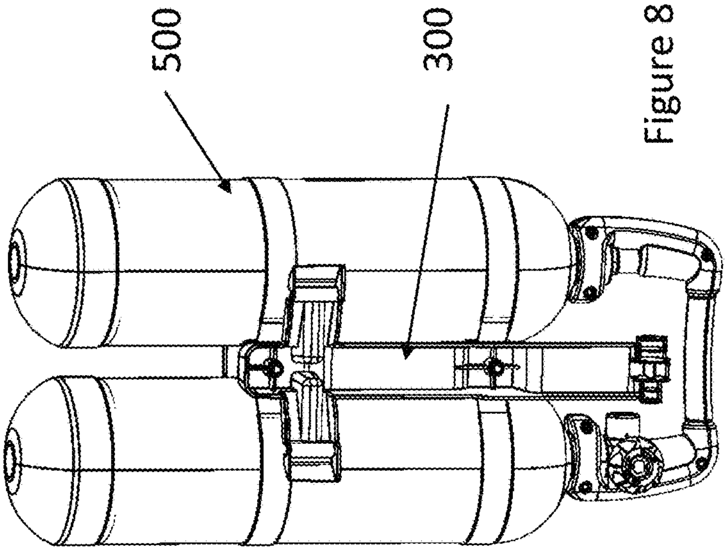
FIG. 8 shows a rear view of a twin pack cylinder assembly mounted to an example adaptor.
Figure 7:
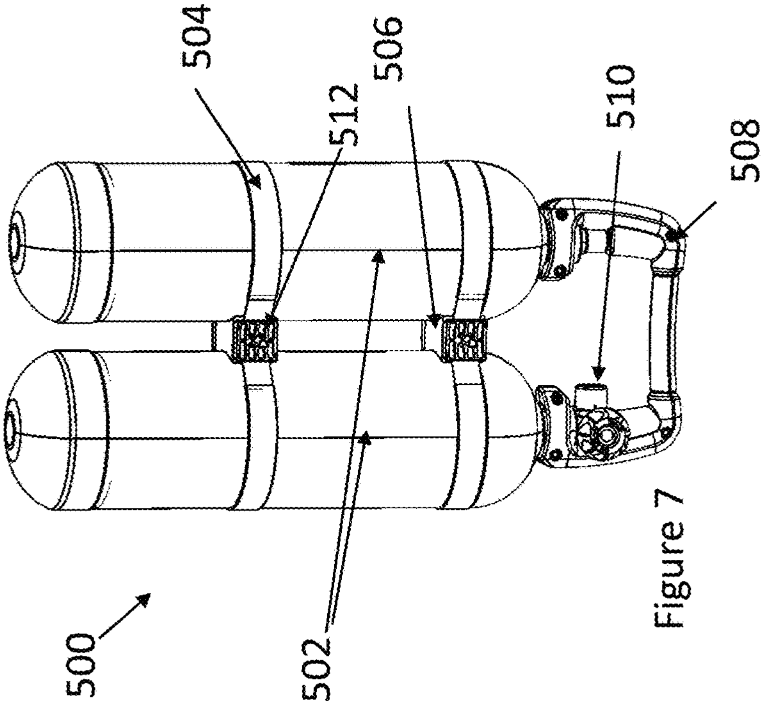
FIG. 7 shows a rear view of a twin pack cylinder assembly.

FIG. 7 shows a rear view of the twin pack assembly 500. The twin pack assembly 500 comprises two cylinders 502 of breathing gas which are fixedly attached together in a side-by-side relationship, with bands 504 and tensioning members 506 to form a single mechanical unit. The rear side of the tensioning members 506 comprises attachment points 512 for attachment to the attachment points 310 of the adaptor bracket 300, as shown in FIG. 8. The tensioning members 506 are tightened by mechanical fastening means, such as bolts, which are used to attach the twin pack assembly 500 to the adaptor bracket 500 at attachment points 310.

The twin pack assembly 500 comprises a connection pipe 508 which provides pneumatic (or fluid) connection between the two cylinders 502. The connection pipe 508 also serves as a handle for carrying the twin pack assembly 500. The twin pack assembly 500 further comprises a valve 510 for connection to the pressure reduction valve 216.

The adaptor bracket 300 as described may be used in a method 600 of converting a single cylinder support 200 for a self-contained breathing apparatus to be used to mount an assembly of multiple cylinders 502 to the support in a multiple cylinder pack configuration. As described above, the support 200 defines a cylinder mount 204 for mounting a single cylinder of compressed gas to the support in a single cylinder configuration, and a component mount 210 for mounting a functional component for the self-contained breathing apparatus in the single cylinder configuration. The method of converting the single cylinder support 200 comprises mounting an adaptor bracket 300 to the support 200 as will be discussed in further detail below. The adaptor bracket 300 comprises mount portions 306, 308 configured to be mounted to the component mount 210, 212, 214 and the cylinder mount 204 of the support 200, and the adaptor bracket 300 is configured for the mounting of an assembly of multiple cylinders to the support in a multiple cylinder pack configuration.

Figure 9:
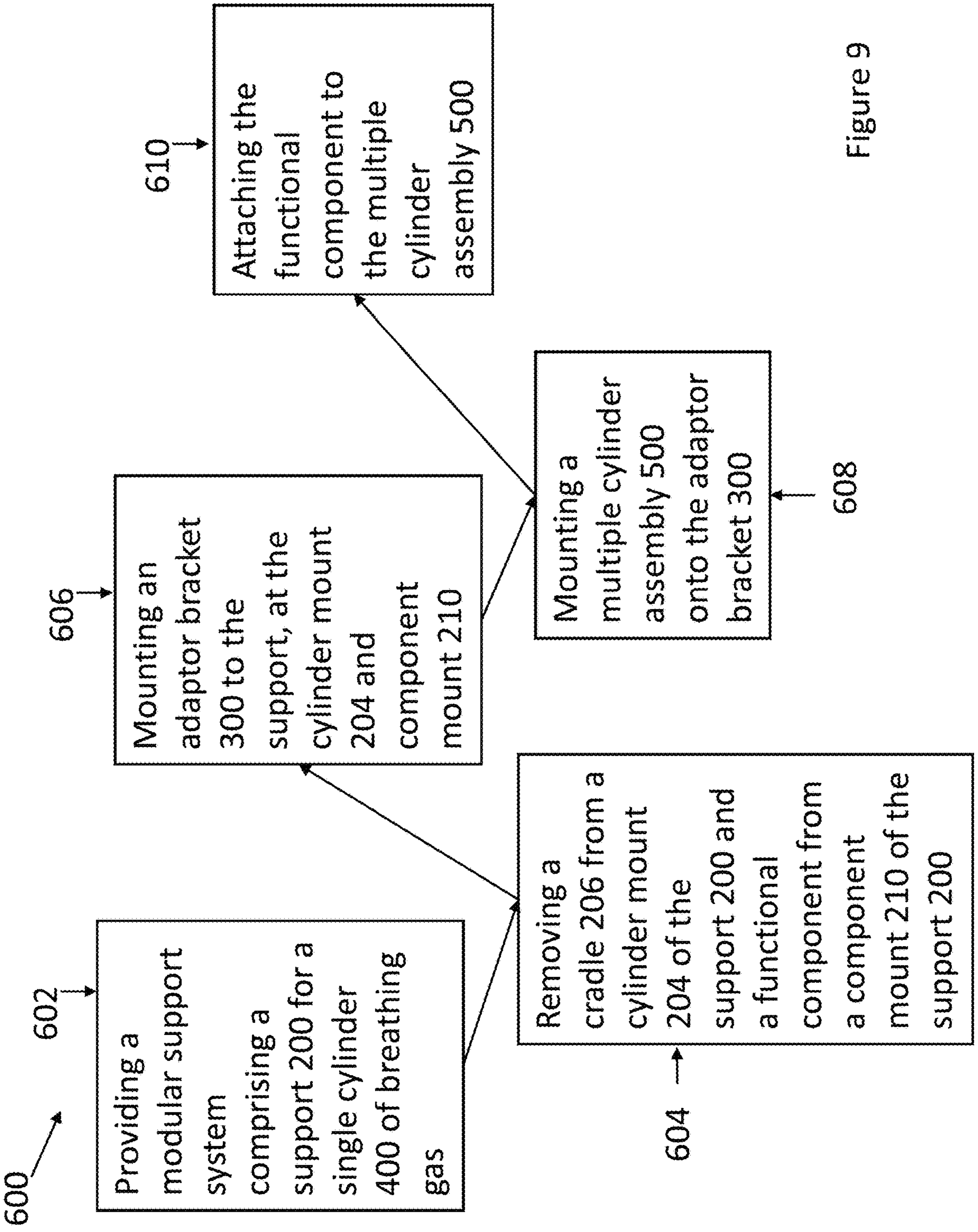
FIG. 9 shows a method of converting a single cylinder support.

The method will now be described with reference to FIG. 9. In a first step 602, a modular support system 100 is provided in a single cylinder configuration. In this configuration, the support 200 is provided with a cradle 206, mounted to the cylinder mount 204 by pins. The modular support system 100 also comprises a functional component, in this example, a pressure reduction valve 216, mounted to a component mount, in this example the pressure reduction valve mount 210. In this example, the pressure reduction valve 216 is snap-fit into the pressure reduction valve mount, but may be attached by any other means as described above. It will be understood that any functional component, such as those described above, may instead of, or in addition to, the pressure reduction valve 216, be removed from a corresponding component mount of the support 200, to enable the mounting of an adaptor bracket 300.

In a second step 604 of the method 600, the pins holding the cradle 206 in place are removed and the cradle 206 itself is removed from the cylinder mount 204. The pressure reduction valve 216 is also removed from the pressure reduction valve mount 210.

In a next step 606, the adaptor bracket 300 is mounted to the support 200, by insertion of the lower mount portion 306 of the adaptor bracket 300 into the pressure reduction valve mount 210. The lower mount portion 306 of the adaptor bracket 300 is retained in the pressure reduction valve mount 210 by a snap fit. As the lower mount portion 306 is substantially cylindrical, the adaptor bracket is able to pivot within the pressure reduction valve mount 210, to bring the upper part of the adaptor bracket 300, in particular the upper mount portions 308, into contact with the support 200. Pins are then inserted into the upper mount portions 308 and support 200 in order to hold the adaptor bracket 300 in a fixed position relative to the support 200. It will be appreciated that in other arrangements, there may be other attachment means to fixedly attach the adaptor bracket 300 and support 200.

In a next step 608, a multiple cylinder pack assembly, in this example a twin pack assembly 500, is then mounted onto the front side of the adaptor bracket 300, via the connection of the mechanical fastening means of the tensioning members 506 with the attachment points 310 of the adaptor bracket 300. In a further step 610, the functional component, for instance the pressure reduction valve 216 which was removed from the pressure reduction valve mount 210, is attached to the valve 510 of the twin pack assembly 500. The twin pack assembly 500 is thereby mounted on the support 200 by the use of the adaptor bracket 300, and the single cylinder support may be used as a support for an assembly of multiple cylinders of compressed gas. In this way, the adaptor 300 enables the conversion of existing single cylinder supports for use with an assembly of multiple cylinders of compressed gas with a quick and easy modification process.

It will be understood that the invention is not limited to the arrangements above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A modular support system for a self-contained breathing apparatus, comprising: a support for a self-contained breathing apparatus, the support comprising a cylinder mount and a component mount, wherein the cylinder mount is for mounting a single cylinder of compressed gas to the support in a single cylinder configuration of the modular support system; and wherein the component mount is for mounting a functional component for the self-contained breathing apparatus in the single cylinder configuration;

the system further comprising an adaptor bracket for mounting an assembly of multiple cylinders to the support in a multiple cylinder pack configuration;

wherein the adaptor bracket has mount portions configured to be mounted to the component mount and the cylinder mount.

2. A modular support system according to claim 1, wherein the mount portions are spaced apart along a longitudinal direction of the adaptor bracket.

3. A modular support system according to claim 1, wherein the component mount is for mounting a component of a pneumatic system, electronic system or a carrying system.

4. A modular support system according to claim 1, wherein the component mount is for mounting a pressure reduction valve associated with a single cylinder of compressed gas, such that the component mount is for mounting a single cylinder of compressed gas via the pressure reduction valve.

5. A modular support system according to claim 1, wherein the cylinder mount is configured for attachment to a cradle for supporting a single cylinder of compressed gas.

6. A modular support system according to claim 1, wherein the adaptor bracket is configured to be pivotably mounted to at least one of the cylinder mount and the component mount.

7. A modular support system according to claim 1, wherein at least one of the mount portions is substantially cylindrical.

8. A modular support system according to claim 1, wherein at least one of the connections between the mount portions and the cylinder mount or component mount is a snap-fit.

9. A modular support system according to claim 1, wherein at least one of the connections between the mount portions and the cylinder mount or component mount is configured to be secured by a pin.

10. A modular support system according to claim 1, wherein the adaptor bracket is substantially T shaped.

11. A modular support system according to claim 1, further comprising two cylinders mounted to the adaptor bracket.

12. A modular support system according to claim 1, wherein the support comprises a plurality of cylinder mounts, and wherein the adapter bracket has mount portions configured to be mounted to the component mount and to at least one of the cylinder mounts.

13. An adaptor bracket for use with the modular support system as defined in claim 1.

14. A method of converting a single-cylinder support for a self-contained breathing apparatus, the support defining a cylinder mount and a component mount, wherein the cylinder mount is for mounting a single cylinder of compressed gas to the support in a single cylinder configuration of the modular support system; and wherein the component mount is for mounting a functional component for the self-contained breathing apparatus in the single cylinder configuration;

the method comprising:

mounting an adaptor bracket to the support, the adaptor bracket comprising mount portions, the mount portions configured to be mounted to the component mount and the cylinder mount, the adaptor bracket for mounting an assembly of multiple cylinders to the support in a multiple cylinder pack configuration.

15. A method of converting a single-cylinder support according to claim 14, further comprising removing a functional component from the support before mounting the adaptor bracket.

* * * * *